United States Patent [19] [11] 4,089,171
Hubbard [45] May 16, 1978

[54] FOUR POSITION VALVE ASSEMBLY

[75] Inventor: Glenn R. Hubbard, Racine, Wis.

[73] Assignee: Webster Electric Company, Inc., Racine, Wis.

[21] Appl. No.: 689,573

[22] Filed: May 24, 1976

[51] Int. Cl.[2] .................... F16D 31/02

[52] U.S. Cl. .................... 60/486; 91/32; 91/461

[58] Field of Search .................... 60/421, 486; 91/29, 91/32, 461

[56] References Cited

U.S. PATENT DOCUMENTS

| | | | |
|---|---|---|---|
| 2,391,930 | 1/1946 | Stone | 91/29 |
| 2,995,012 | 8/1961 | Cassaday | 60/486 |
| 3,776,098 | 12/1973 | Behrens | 91/29 |
| 3,811,282 | 5/1974 | Schexnayder | 60/421 |
| 3,949,783 | 4/1976 | Plate | 60/486 |
| 3,975,909 | 8/1976 | McBurnett | 60/486 |

FOREIGN PATENT DOCUMENTS

| | | | |
|---|---|---|---|
| 2,308,810 | 2/1973 | Germany | 60/421 |

*Primary Examiner*—Martin P. Schwadron
*Assistant Examiner*—Abraham Hershkovitz
*Attorney, Agent, or Firm*—Mason, Kolehmainen, Rathburn & Wyss

[57] ABSTRACT

A hydraulic power circuit for operating hydraulic motors at several speeds includes first and second fluid sources and a valve assembly for combining flow from the second source with flow from the first source as a faster motor speed is required. The valve assembly includes a first valve controlling the flow of fluid from the first source to the motors while a slow motor speed is required. The valve assembly also includes a fluid actuated valve controlling the flow of fluid from the second source to the motors as a faster motor speed is required. The fluid actuated valve is actuated by flow from the first source through metering ducts. Once the fluid actuated valve is actuated, fluid from the second source is mixed with fluid from the first source and the valve assembly communicates the increased flow to the motors thus obtaining a faster motor speed.

3 Claims, 4 Drawing Figures

FOUR POSITION VALVE ASSEMBLY

BACKGROUND OF THE INVENTION

A. Field of the Invention

The present invention relates to a new and improved valve assembly for controlling the flow of fluid from first and second fluid sources to one or more motors in order to provide increased motor speeds when demanded, and to a new and improved method for providing greater motor speeds in a hydraulic system.

B. Description of the Prior Art

Typically, in vehicles of the type powered by a hydraulic motor, such as a grass mower for golf greens, there are provided neutral, reverse and forward modes. The forward or working mode of the motor is a slow speed employed while the vehicle is used to mow a golf green. The motor speed in this mode must be slow in order to avoid uneven grass cutting.

Once the vehicle has completed a job; for example, once a green is mowed, it is necessary to move to another job or green or return to the storage area. During this mode of operation, the transportation mode, a faster drive speed is desired.

To obtain the various modes of operation and the transportation mode of operation, prior art valve assemblies include a spool valve having one or more lands for communicating pressurized fluid to the motors in a first direction for reverse operation of the motors and in a second direction for forward operation. In a third or neutral mode the prior art spool valves direct the fluid to a reservior. For the fourth or transportation mode of the motors the prior art valve assemblies have a fourth position for the single spool valve whereby pressurized fluid is directed to the motors at the appropriate times. This fourth valve position may either increase the amount of flow from a single fluid source to the motor or introduce fluid from a second source and combine the flows from both sources to the motor, thus increasing the motor speed.

These prior art devices employ complex coring arrangements, have poor metering characteristics and high leakage rates due to small sealing lands necessary on the single valve. In addition, these valves are normally manually operated into the fourth position resulting in abrupt introduction of the increased fluid flow with resultant detrimental pressure spikes.

SUMMARY OF THE INVENTION

An object of the present invention is to provide a new and improved valve assembly for operating a hydraulic motor at different speeds.

Another object of the present invention is to provide a new and improved valve assembly for increasing the speed of a hydraulic motor without introducing undesirable pressure spikes.

Further, an object of the present invention is to provide a new and improved valve assembly to be employed in a hydraulic power circuit that allows economical coring arrangements and provides a low leakage rate.

Briefly, the present invention encompasses a new and improved valve assembly to be employed in a hydraulic power circuit having one or more motors and one or more sources of pressurized fluid. The valve assembly includes first and second spool valves. The first or main valve is movable by external control to any one of four positions and controls the flow of fluid from a source to the motors. The second valve is pressure actuated and communicates with metered fluid flow controlled by the first valve.

In a first position of the main valve, fluid from the source is directed by the valve to a motor to actuate the motor in the forward direction. In a second position the fluid is directed to the motor to actuate the motor in the reverse direction. In a third position the valve directs the fluid from the source to a reservior bypassing the motor.

Each of these three positions and related operations of the first valve are similar in some respects to prior art valve assemblies. However, the valve assembly of the present invention further includes the second, fluid actuated valve that controls an additional source of pressurized fluid. The second valve is pilot actuated by pressurized fluid controlled by the first valve once the first valve is moved to a fourth position. The first valve is moved to its fourth position by the external source if a faster forward motor speed is desired as; for example, when a golf green mower powered by the motor travels from one green to another.

In the fourth position of the main spool valve, a portion of the pressurized fluid from the first source is directed to the motor and a lesser portion of pressurized fluid actuates the second valve to a position allowing pressurized fluid from the second source to mix with that from the first source. This increased flow results in a faster motor speed.

BRIEF DESCRIPTION OF THE DRAWING

The above and other objects and advantages and novel features of the present invention will become apparent from the following detailed description of a preferred embodiment of the invention illustrated in the accompanying drawing wherein.

DESCRIPTION OF THE PREFERRED EMBODIMENT

Figure 1:
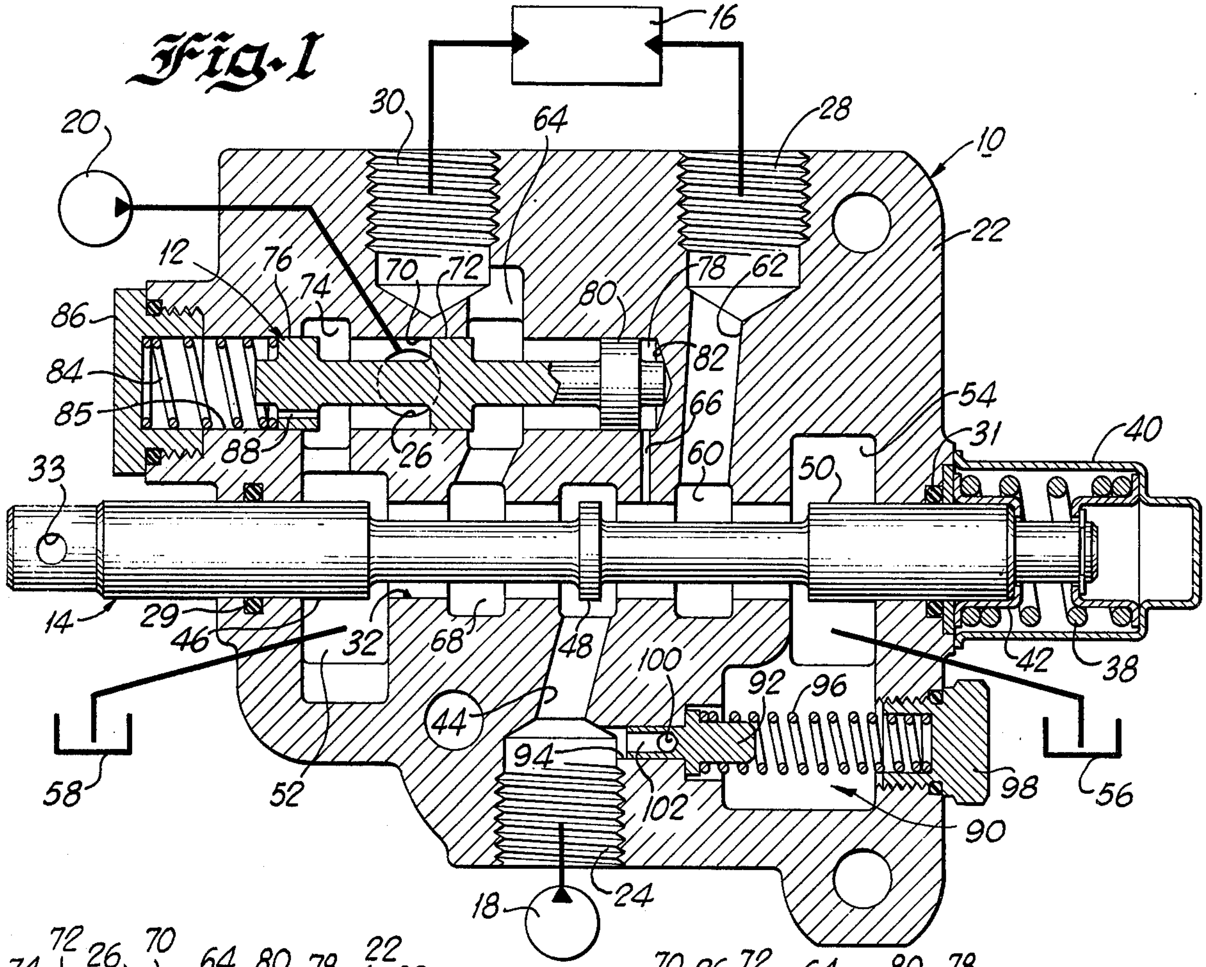
FIG. 1 is a schematic illustration of a hydraulic power circuit including a valve assembly constructed in accordance with the principles of the present invention.

Having reference now to the figures and initially to FIG. 1, there is illustrated a valve assembly designated as a whole by the reference numeral 10 and embodying the principles of the present invention. Assembly 10 includes a pilot actuated valve spool generally designated as 12 and a main spool valve generally designated as 14.

The valve assembly 10 may be employed in a hydraulic circuit to control fluid for powering a motor generally designated in FIG. 1 as 16. The motor 16 and the hydraulic circuit including the valve assembly 10 may be used to propel a vehicle such as a golf green mower. The motor 16 may be powered in the forward, neutral, reverse and fast forward or transportation modes depending on the direction and volume of the flow of the fluid used to power the motor 16.

The valve assembly 10 controls the operation of the motor 16 by controlling the flow of pressurized fluid from fluid sources such as; for example, pumps 18 and 20. By controlling the volume and direction of fluid flow from the sources 18 and 20 to the motor 16, the mode of operation (forward, fast forward, reverse or neutral) of the motor 16 is controlled.

The assembly 10 illustrated, as mentioned, may be employed to power a motor that in turn propels a vehicle such as a golf green mower. In this assembly 10, the second fluid source 20 provides pressurized fluid to the circuit that propels the reel mowers of the mower. The flow of fluid from pump 20 may be manually controlled by a valve (not shown) to operate the reel mowers while the mower is in the forward and reverse modes of operation. In the neutral and fast forward or transportation modes of the mower, the reel mowers are not operated and the manual valve is actuated to direct fluid from pump 20 to a reservoir or to the port 26 in the valve assembly 10. The main spool valve 14 may be externally actuated manually or otherwise to control the flow of pressurized fluid from the source 18 to the motor 16.

To provide the vehicle propelled by the motor 16 with a fourth or fast forward mode of operation so that, for example, the vehicle can be rapidly transported from one work site to another; the pilot actuated spool valve 12 is included in assembly 10. The pilot actuated spool valve 12 is actuated by pilot pressure controlled by the main spool valve 14. The pilot actuated spool valve 12 controls the flow of pressurized fluid from the second source of pressurized fluid 20 and directs flow from the source 20 in the fast forward or transportation mode so as to combine the fluid with that from source 18. This combined flow passes through the motor 16 resulting in an increased motor 16 speed.

In the embodiment illustrated, the valve assembly 10 includes a housing 22 in which are mounted the main valve 14 and the pilot actuated valve 12. The valve assembly 10 is in fluid communication with the hydraulic circuit and the motor 16 through a plurality of ports. The valve assembly 10 communicates with the first pressure source 18 through a threaded port 24. The second fluid source 20 communicates with the valve assembly 10 through port 26. In addition, the valve assembly 10 is in fluid communication with motor 16 through threaded ports 28 and 30.

Main valve 14 controls the flow of fluid from source 18 to the motor 16 and is reciprocally mounted within housing 22 in a main, elongated bore 32. At first and second ends of the main spool valve 14 in the bore 32 there are O-rings 29 and 31, respectively, sealing off the bore 32 around the spool 14 to prevent leakage of pressurized fluid out of the housing 22. In addition, the first end of the main spool valve 14 includes an aperture 33 to which a throttle or similar device (not shown) may be attached to allow manual or automatic actuation of the main spool valve 14.

As illustrated in FIG. 1, the main spool valve 14 is in the neutral position and is biased to this position by a spring 38 mounted within a spring housing 40. Spring 38 at one end abuts the spring housing 40 and at the other end abuts a plate 42 that is fitted over the second end of spool valve 14.

To communicate fluid to spool valve 14, fluid from the port 24 is conducted to the bore 26 through a core passage 44. In order for the main spool valve 14 to direct this fluid from source 18 to the motor 16, spool valve 14 includes three enlarged portions or lands 46, 48 and 50. These lands cooperate with bore 32 to block the flow of fluid from passage 44 from flowing through selected core passages in the housing 22. For example, in the neutral mode illustrated in FIG. 1, land 48 is positioned within the enlarged core outlet 52 in bore 32 and land 50 is positioned within the enlarged core outlet 54 thus allowing fluid flow through bore 32. Accordingly, fluid flows from passage 44 around land 48 and along bore 32 to core outlets 52 and 54. Core outlet 54 communicates directly with reservoir 56 and core outlet 52 communicates with reservoir 58. Fluid is not communicated to motor 16 and the motor 16 remains in its neutral mode. As previously mentioned, in the neutral mode fluid from source 20 is also directed to a reservoir and does not flow to port 26. In the altnerative, fluid may flow from source 20 to port 26 and is directed by valve 12 to reservoir 52.

Figure 2:
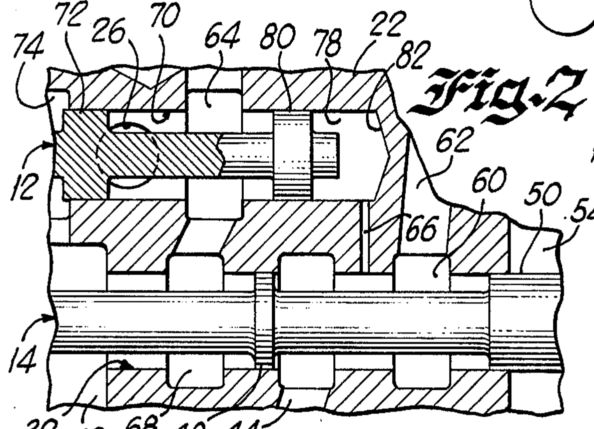
FIG. 2 is a fragmentary view of part of the assembly of the present invention illustrated in FIG. 1 in a reverse mode position.

To actuate motor 16 in the forward or reverse mode, spool valve 14 is moved to position land 48 within bore 32 to block the flow of fluid from source 18 in a predetermined direction within housing 22. For example, to power motor 16 in the reverse mode, spool valve 14 is actuated to move land 48 to the position illustrated in FIG. 2. In this position, fluid from source 18 passes along bore 32 to the enlarged core passage 60 that communicates with core passage 62. Fluid cannot flow beyond passage 60 since bore 32 beyond passage 60 is blocked by land 50. Fluid then flows along core passage 62 and through port 28 to pass through motor 16 powering it in the reverse direction.

After passing through the motor 16, the fluid returns to the valve assembly 10 through port 30 and flows along passage 64 to bore 32 at a point behind land 48. The fluid then flows along bore 32 to core outlet 52 and to reservoir 58.

In this position of the land 48 (FIG. 2), pressurized fluid is also directed to and through duct 66 whereupon the fluid pressure interacts with the pilot actuated spool valve 12. Under the influence of this pressure, the pilot actuated spool valve 12 moves in a manner to be described hereinafter to open port 26 to core passage 64. However, as previously mentioned, in the reverse mode, the entire fluid flow from source 20 is directed by a valve to the reel mowers and, accordingly, no flow passes through port 26 to bore passage 64 in this mode of operation.

Figure 3:
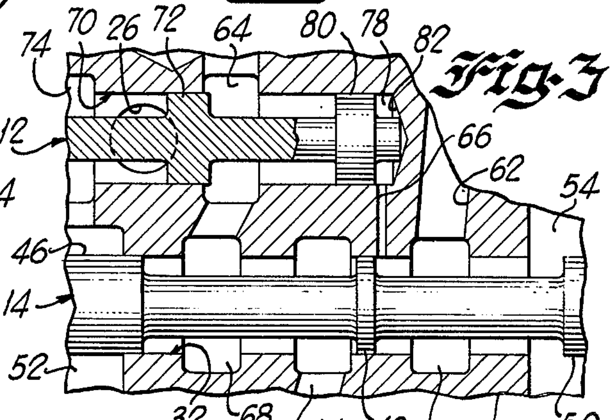
FIG. 3 is a view similar to FIG. 2 illustrating the assembly in a forward mode position.

To power the motor 16 in the forward direction, the main valve spool 14 is moved to position land 48 within bore 32 as illustrated in FIG. 3. In this position, land 48 blocks the flow of fluid from source 18 to bore passage 60. Instead, fluid from source 18 enters the valve assembly 10 through port 24 and flows along passage 44 and bore 32 to enlarged core passage 68. Flow beyond core passage 68 is blocked by the land 46 within the bore 32. Fluid then flows along core passage 64, out port 30, and through motor 16 powering the motor 16 in the forward mode and propelling the vehicle in the forward mode.

After passing through the motor 16, the pressurized fluid returns to the valve assembly 10 through port 28 and flows along bore passage 62 to enlarged bore passage 60 behind land 48. The pressurized fluid then flows along bore 32 to core outlet 54 and to the reservoir 56. The duct 66 is blocked to fluid flow along the bore 32 and, thus, the pilot actuated spool valve 12 is not actuated during this mode of operation.

Figure 4:
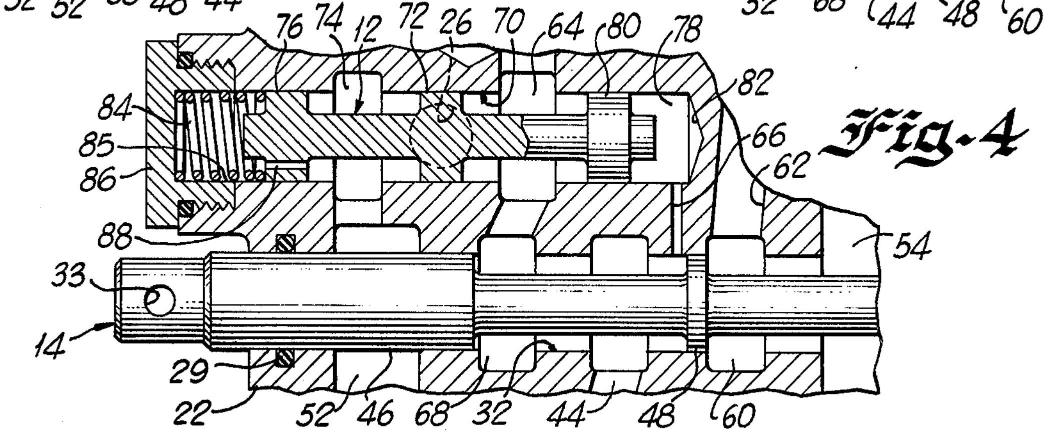
FIG. 4 is a fragmentary view similar to FIG. 2 illustrating the assembly in a transporting mode position.

If it is desired to propel the vehicle, such as the golf green mower, in the fast forward or transportation mode, the main spool valve 14 is shifted to the position illustrated in FIG. 4. In this position, fluid from the source 18 is again blocked from bore passage 60 by land 48 and, thus, flows along bore 32 to enlarged core passage 68. Flow beyond the enlarged core passage 68 is blocked by land 46. Fluid then flows along core passage 64 out of port 30 and through motor 16 powering the motor 16 in the forward direction. After passing through the motor 16 the fluid returns to the valve assembly 10 through port 28 flowing along the passages 62, 60 and 54 to reservoir 56.

It is in this fast forward or transportation mode of operation that the pilot actuated spool valve 12 is actuated to control the flow of fluid from the pressurized fluid source 20. In the fast forward mode the operator of the vehicle such as the golf green mower manually actuates a valve to discontinue flow from the source 20 to the reel drive circuit and switches the flow to the outlet 26. Simultaneously with the movement of the main valve 14 to the fast forward position illustrated in FIG. 4, the pilot actuated spool valve 12 is in a position within bore 70 as illustrated in FIG. 1. Flow from the source 20 enters the valve assembly 10 through port 26, and as a result of the position of land 72, the flow of fluid is directed from port 26 to passage 74. Flow beyond core passage 74 is blocked by land 76 on the pilot actuated spool valve 12. The fluid then flows into enlarged core outlet 52 and to reservoir 58. Simultaneously with the actuation of main spool valve 14, fluid flow from source 18 entering bore 32 partially flows through duct 66 to chamber 78 defined between land 80 on spool valve 12 and the end 82 of bore 70.

Pilot actuated spool valve 12 is biased to the position illustrated in FIG. 1 by a spring 84 mounted in spring chamber 85 within bore 70 and held therein by threaded end cap 86. In addition, further biasing is provided by pressurized fluid within spring chamber 85 communicated to chamber 85 by an orifice passage 88 of a predetermined dimension fabricated in land 76.

Accordingly, during the fast forward mode of operation, a portion of the fluid from source 18 flows through the duct 66 into chamber 78 and as the pressure builds up against the biasing force of the fluid passing through metered orifice 88 and of spring 84, the pilot actuated spool valve 12 gradually moves in a leftward direction as viewed in FIG. 1, thus, smoothly directing the fluid flow from port 26 into core passage 64. This pressurized fluid from port 26 entering core passage 64 mixes with the pressurized fluid from source 18 flowing through passage 64 resulting in an increased flow out port 30 and through motor 16 resulting in an increased motor speed.

Since the pilot actuated spool valve 12 is moved in a controlled and smooth manner under the influence of the fluid pressure within chamber 78 acting against the biasing force of the spring 84 and the controlled biasing force of the pressurized fluid entering the spring chamber 85 through metered orifice 88, the mixing of the pressurized fluid from source 18 and 20 is gradual and smooth such that no pressure spikes are introduced into the fluid system that could damage the valve assembly 10. In addition, protection of the valve assembly 10 from undesirably high fluid pressures is provided through the employment of the relief valve generally designated as 90.

The relief valve 90 includes a plug member 92 mounted in a bore 94 fabricated within the housing 22. The bore 94 communicates the port 24 with the outlet core passage 54. The plug member 92 is biased into the bore 94 by spring 96 that is held within the housing 22 by threaded cap 98. If fluid pressure is introduced into port 24 at an undesirably high pressure level, the plug member 94 is biased against the spring 96 until orifice 100 within the plug member 92 clears bore 94. Fluid may then flow within passage 102 of plug 92 to aperture 100 and then into the bore outlet 54 to reservoir 56 thereby preventing the high pressure fluid from flowing through the valve assembly 10.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the U.S. is:

1. An apparatus for controlling the speed of at least one motor or the like by selectively controlling the fluid flow from first and second fluid sources to said motor comprising:

- a housing;
- a first elongated bore in said housing;
- a first movable valve slideably mounted in said first bore;
- a first passage in said housing for communicating said first fluid source to said first bore;
- a second passage in said housing communicating said first bore with said motor;
- a third passage in said housing communicating said first bore with said meter;
- a second bore in said housing said second bore in fluid communication with said second source and said third passage;
- a fourth passage communicating said first and second bores with a fluid reservoir;
- a pressure sensitive, movable valve mounted in said second bore for controlling fluid flow from said second source to said motor;
- said pressure sensitive valve including means for controlling fluid flow from said second fluid source to one of said third and fourth passages;
- said pressure sensitive valve including a pressure surface for interacting with fluid;
- a pilot passage communicating said pressure surface with said first bore;
- said first valve being slidable to a first position to direct a portion of said fluid from said first source to said pilot passage to actuate said pressure sensitive valve to a second position communicating said second source with said third passage;
- said pressure sensitive valve comprises a pilot spool valve including at least one land against which said fluid from said second source acts and a passage in said land for communicating said fluid from said second source to a portion of said second bore adjacent said land thereby providing a varying biasing force acting in opposition to the force developed by said fluid from said first source acting on said pressure surface on said pressure sensitive valve; and
- biasing means for biasing said pilot spool valve to a first position communicating said second source with said fourth passage.

2. The apparatus claimed in claim 1 further comprising pressure relief means for venting pressure from said first passage means to said reservoir.

3. The apparatus claimed in claim 1 wherein said first valve comprises a manually actuated spool valve including at least one land that upon manual actuation of said first valve operates to direct fluid from said first source to said pilot passage.

* * * * *